(12) United States Patent
Smith et al.

(10) Patent No.: US 10,845,920 B2
(45) Date of Patent: Nov. 24, 2020

(54) SYSTEMS AND METHODS FOR INJECTING LIGHT INTO COVER GLASS

(71) Applicant: FINGERPRINT CARDS AB, Gothenburg (SE)

(72) Inventors: Patrick Smith, San Jose, CA (US); Paul Wickboldt, San Jose, CA (US); Marek Mienko, San Jose, CA (US); Pascale El Kallassi, San Jose, CA (US)

(73) Assignee: FINGERPRINT CARDS AB, Gothenburg (SE)

( * ) Notice: Subject to any disclaimer, the term of this patent is extended or adjusted under 35 U.S.C. 154(b) by 0 days.

(21) Appl. No.: 16/093,794

(22) PCT Filed: May 12, 2017

(86) PCT No.: PCT/US2017/032519
§ 371 (c)(1),
(2) Date: Oct. 15, 2018

(87) PCT Pub. No.: WO2017/197337
PCT Pub. Date: Nov. 16, 2017

(65) Prior Publication Data
US 2019/0138154 A1    May 9, 2019

Related U.S. Application Data

(60) Provisional application No. 62/336,508, filed on May 13, 2016.

(51) Int. Cl.
*G06F 3/042* (2006.01)
*B32B 7/12* (2006.01)
(Continued)

(52) U.S. Cl.
CPC .............. *G06F 3/0421* (2013.01); *B32B 7/02* (2013.01); *B32B 7/023* (2019.01); *B32B 7/12* (2013.01);
(Continued)

(58) Field of Classification Search
CPC ....... G06F 3/0421; G06F 3/042; B32B 7/023; B32B 7/12; B32B 17/06; G06K 9/00006; G06K 9/00013; G06K 9/0004
See application file for complete search history.

(56) References Cited

U.S. PATENT DOCUMENTS 4,728,186 A    3/1988  Eguchi et al.
7,142,189 B2   11/2006 Engelmann
(Continued)

FOREIGN PATENT DOCUMENTS

WO    WO 2016/119492    8/2016

OTHER PUBLICATIONS

International Preliminary Report on Patentability and Written Opinion in International Patent Application No. PCT/US2017/032519 dated Nov. 22, 2018.
(Continued)

*Primary Examiner* — Sardis F Azongha
(74) *Attorney, Agent, or Firm* — RMCK Law Group, PLC

(57) ABSTRACT

An input device includes a transparent layer having a top surface and a bottom surface, and an inner layer positioned below and directly contacting the bottom surface of the transparent layer, wherein the inner layer has a second index of refraction ($n_2$) that is lower than a first index of refraction ($n_1$) of the transparent layer, and wherein a first region of the transparent layer extends past an end of the inner layer. The device also includes a light source positioned below the bottom surface of the transparent layer, and a reflector
(Continued)

arrangement configured to reflect light emitted by the light source into the transparent layer in or proximal to the first region of the transparent layer, wherein at least a portion of the light reflected into the transparent layer propagates within the transparent layer by total internal reflection.

20 Claims, 17 Drawing Sheets

(51) Int. Cl.
    *B32B 7/023*     (2019.01)
    *B32B 17/06*     (2006.01)
    *G06K 9/00*     (2006.01)
    *G06K 9/20*     (2006.01)
    *B32B 7/02*     (2019.01)

(52) U.S. Cl.
    CPC ............ *B32B 17/06* (2013.01); *G06K 9/0004* (2013.01); *G06K 9/00013* (2013.01); *G06K 9/209* (2013.01); *B32B 2457/00* (2013.01); *G06F 2203/04109* (2013.01)

(56) References Cited

U.S. PATENT DOCUMENTS

| | | | |
|---|---|---|---|
| 7,432,893 B2 | 10/2008 | Ma et al. | |
| 7,995,039 B2 | 8/2011 | Eliasson et al. | |
| 8,144,271 B2 | 3/2012 | Han | |
| 8,665,178 B1* | 3/2014 | Wang | G02B 27/0172 345/7 |
| 8,929,697 B1* | 1/2015 | Conner | G02B 6/42 362/301 |
| 9,405,382 B2* | 8/2016 | Drumm | G06F 3/0308 |
| 9,557,846 B2* | 1/2017 | Baharav | G06F 3/0421 |
| 9,612,388 B2* | 4/2017 | Chen | G02F 1/167 |
| 2003/0210537 A1 | 11/2003 | Engelmann | |
| 2006/0188196 A1* | 8/2006 | Charters | G02B 6/122 385/33 |
| 2009/0033637 A1 | 2/2009 | Han | |
| 2009/0154198 A1* | 6/2009 | Lee | G02B 6/0081 362/624 |
| 2010/0253649 A1 | 10/2010 | Chen | |
| 2011/0063604 A1 | 3/2011 | Hamre et al. | |
| 2011/0102372 A1 | 5/2011 | Han et al. | |
| 2011/0157097 A1 | 6/2011 | Hamada et al. | |
| 2011/0255303 A1 | 10/2011 | Nichol et al. | |
| 2013/0127790 A1 | 5/2013 | Wassvik | |
| 2015/0009687 A1 | 1/2015 | Lin | |
| 2016/0247010 A1* | 8/2016 | Huang | G02B 5/20 |
| 2016/0266695 A1* | 9/2016 | Bae | G06F 1/1643 |

OTHER PUBLICATIONS

Written Opinion of the International Searching Authority in International Application No. PCT/U2017/032519 dated Aug. 9, 2017.

* cited by examiner

SYSTEMS AND METHODS FOR INJECTING LIGHT INTO COVER GLASS

CROSS-REFERENCE TO RELATED APPLICATIONS

The present application is a 371 U.S. National Stage of International Patent Application No. PCT/US2017/032519, filed May 12, 2017, and titled "Systems and Methods for Injecting Light Into Cover Glass," which claims the benefit under 35 U.S.C. § 119(e) of U.S. Provisional Application Ser. No. 62/336,508, filed May 13, 2016, and titled "Light Injection Into Cover Glass," each of which is hereby incorporated by reference in its entirety.

FIELD

This disclosure generally relates to display devices, and more particularly to touch sensitive display devices incorporating an optical fingerprint sensor.

BACKGROUND

Input devices including touch sensor devices (also commonly called touchpads or proximity sensor devices), as well as fingerprint sensor devices, are widely used in a variety of electronic systems.

Touch sensor devices typically include a sensing region, often demarked by a surface, in which the touch sensor device determines the presence, location and/or motion of one or more input objects, typically for purposes allowing a user to provide user input to interact with the electronic system.

Fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensors are also often used in smaller computing systems (such as touch screens integrated in mobile devices such as smartphones and tablets).

SUMMARY

According to an embodiment, an input device is provided that includes a transparent layer having a top surface and a bottom surface, and an inner layer positioned below and directly contacting the bottom surface of the transparent layer, wherein the inner layer has a second index of refraction ($n_2$) that is lower than a first index of refraction ($n_1$) of the transparent layer, and wherein a first region of the transparent layer extends past an end of the inner layer. The device also includes a light source positioned below the bottom surface of the transparent layer, and a reflector arrangement configured to reflect light emitted by the light source into the transparent layer in or proximal to the first region of the transparent layer, wherein at least a portion of the light reflected into the transparent layer propagates within the transparent layer by total internal reflection.

According to another embodiment, an input device is provided that includes a transparent cover layer having a top surface and a bottom surface, and a material layer positioned below and directly contacting the bottom surface of the transparent cover layer, wherein the material layer has a second index of refraction ($n_2$) that is lower than a first index of refraction ($n_1$) of the transparent cover layer, and wherein a first region of the transparent cover layer extends past an end of the material layer. The device also includes a display layer disposed below the material layer, a light source positioned below the display layer, and a reflector arrangement configured to reflect light emitted by the light source into the transparent cover layer in or proximal to the first region of the transparent cover layer, wherein at least a portion of the light reflected into the transparent cover layer propagates within the transparent cover layer by total internal reflection.

In certain embodiments, a reflector arrangement includes a light injection component positioned below the transparent cover layer proximal to the first region of the transparent cover layer, wherein the light injection component has an index of refraction substantially the same as the first index of refraction ($n_1$) of the transparent cover layer. In certain aspects, the reflector arrangement includes a reflecting surface formed on or proximal to an end of the transparent cover layer. In certain aspects, the reflecting surface may have one of a linear shape, a convex shape, a curved shape, and a faceted shape. In certain aspects, an input device further includes an optical sensor positioned or located below the material layer and configured to detect a fingerprint or other object proximal to the top surface of the transparent cover layer and illuminated by the at least a portion of the light reflected into the transparent cover layer. In certain aspects, the optical sensor may be positioned or located between a display layer and the material layer, or below a display layer.

According to a further embodiment, an input device is provided that includes a transparent cover layer having a top surface and a bottom surface, a waveguide layer positioned below the bottom surface of the transparent cover layer, a material layer positioned below and directly contacting a bottom surface of the waveguide layer, wherein the material layer has a second index of refraction ($n_2$) that is lower than a first index of refraction ($n_1$) of the waveguide layer, wherein a first region of the waveguide layer extends past an end of the material layer, a light source positioned below the bottom surface of the waveguide layer, and a reflector arrangement configured to reflect light emitted by the light source into the waveguide layer in the first region of the waveguide layer, wherein at least a first portion of the light reflected into the waveguide layer propagates within the waveguide layer by total internal reflection. The input device also includes a light extraction feature positioned or located on the top surface of the waveguide layer between the waveguide layer and the transparent cover layer and configured to redirect a portion of the light propagating within the waveguide toward the top surface of the transparent cover layer. In certain aspects, the light extraction feature includes a diffraction grating.

According to yet a further embodiment, an input device is provided that includes a transparent cover layer having a top surface and a bottom surface, a waveguide layer positioned below the bottom surface of the transparent cover layer, a material layer positioned below and directly contacting a bottom surface of the waveguide layer, a light source positioned below the bottom surface of the waveguide layer. And a reflector arrangement configured to reflect light emitted by the light source into the waveguide layer in a first region of the transparent cover layer. The material layer has a second index of refraction ($n_2$) that is lower than a first index of refraction ($n_1$) of the waveguide layer, the transparent cover layer has a third index of refraction ($n_3$) that is the same as or substantially the same as the first index of refraction ($n_1$) of the waveguide layer, wherein the first region of the waveguide layer extends past an end of the material layer; and wherein at least a portion of the light reflected into the waveguide layer propagates within both the waveguide layer and the transparent cover layer by total internal reflection. In certain aspects, the input device further includes an adhesive layer between the bottom surface of the transparent cover layer and a top surface of the waveguide layer, wherein the adhesive layer has a fourth index of refraction ($n_4$) that is the same as or substantially the same as the first index of refraction ($n_1$) of the waveguide layer.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE SEVERAL VIEWS OF THE DRAWINGS

The detailed description is described with reference to the accompanying figures. The use of the same reference numbers in different instances in the description and the figures may indicate similar or identical items.

DETAILED DESCRIPTION

The following detailed description is exemplary in nature and is not intended to limit the disclosure or the application and uses of the disclosure. Furthermore, there is no intention to be bound by any expressed or implied theory presented in the preceding background and brief description of the drawings, or the following detailed description.

Figure 1:
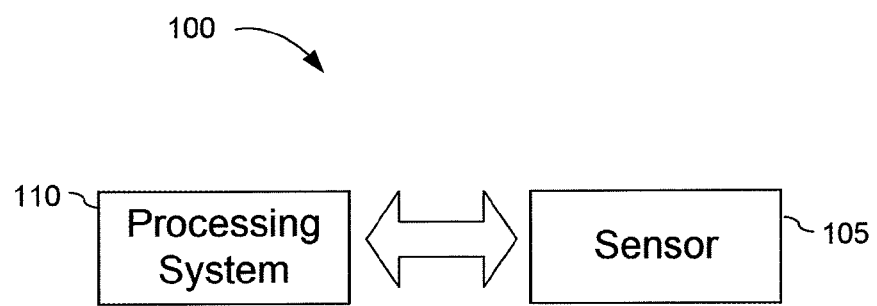
FIG. 1 is a block diagram of an example input device.

FIG. 1 is a block diagram of an example input device 100. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, a sensor 105 is included with the input device 100. The sensor 105 comprises one or more sensing elements configured to sense input provided by one or more input objects in a sensing region. Examples of input objects include fingers, styli, and hands. Sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 may utilize any suitable combination of sensor components and sensing technologies to detect user input in the sensing region. Some implementations utilize arrays or other regular or irregular patterns of multiple sensing elements to detect the input. Example sensing techniques that the input device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastive sensing techniques, magnetic sensing techniques, and/or radar sensing techniques.

For example, the input device 100 may use optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, CMOS image sensor arrays, CCD arrays, thin-film detectors, and other suitable photosensors sensitive to light in wavelength(s) of interest. Active illumination may be used to provide light to the sensing region, and reflections from the sensing region in the illumination wavelength(s) may be detected to determine input information corresponding to the input object.

One example optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to scatter and partially transmit across this interface at the region of contact by the input object. An example of this is presence of a finger introduced to an input surface defined by a glass to air interface. The higher refractive index of human skin compared to air causes light incident at the input surface at the critical angle of the interface to air to be partially transmitted across the input interface and scattered by the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system for an optical sensor device may comprise driver circuitry configured to drive illumination signals to one or more LEDs or other light sources, and/or receiver circuitry configured to receive signals from optical receiving elements.

The processing system 110 may include electronically-readable instructions, such as firmware code, software code, and/or the like. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface or display integrated biometric sensing interface. The display device may be any suitable type of dynamic display capable of displaying a visual interface to a user, including an inorganic light emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for TFT circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
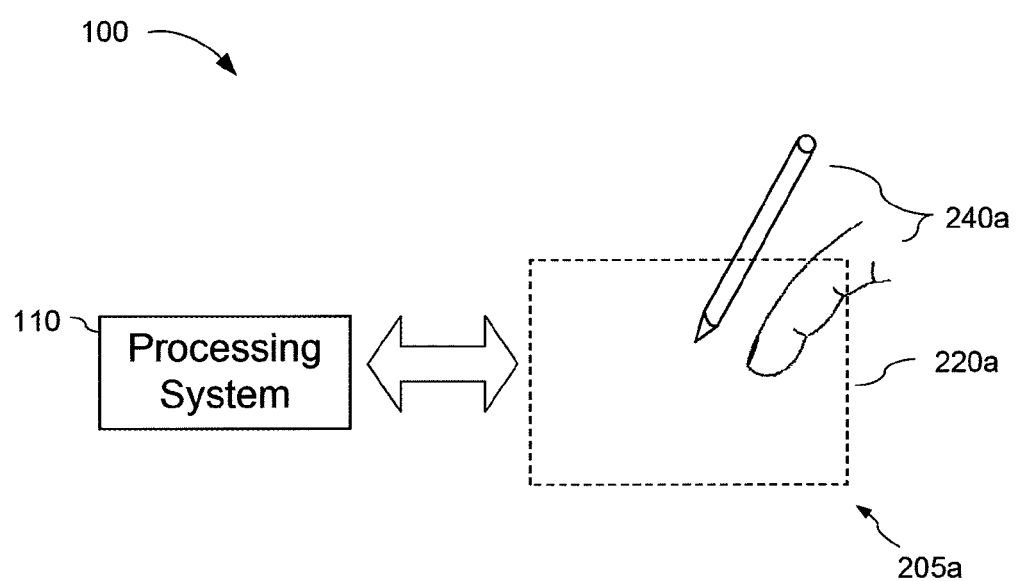
FIG. 2A is a block diagram of another example input device.
Figure 2B:
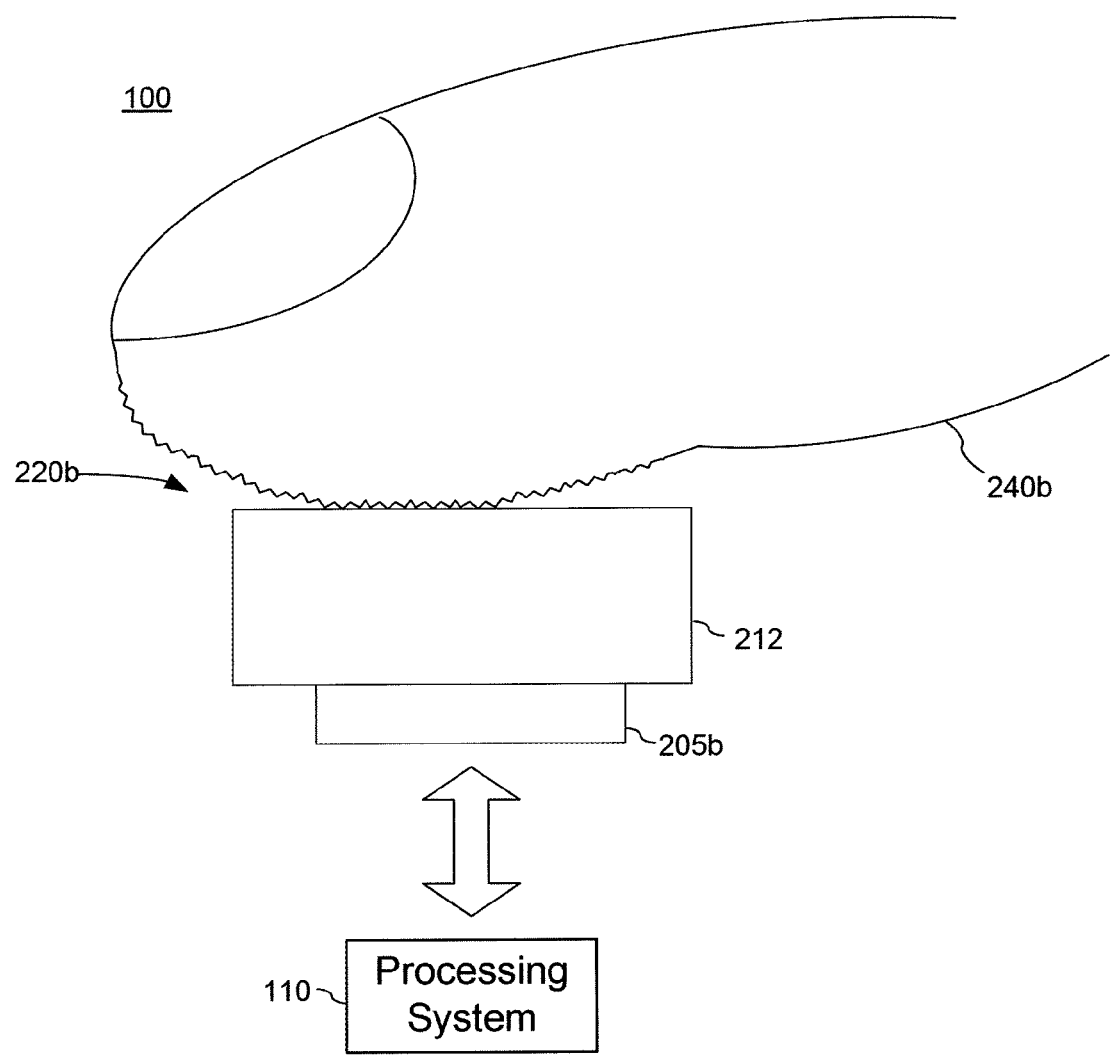
FIG. 2B is a block diagram of another example input device.

FIGS. 2A-2B depict further example input devices 100. In FIG. 2A, the input device 100 is shown as including a touch sensor 205a. The touch sensor 205a is configured to detect position information of an input object 240a within the sensing region 220a. The input object 240a may include a finger or a stylus, as shown in FIG. 2A. The sensing region 220a may include an input surface having a larger area than the input object. The touch sensor 205a may include an array of sensing elements with a resolution configured to detect a location of a touch to the input surface.

In FIG. 2B, the input device 100 is shown as including a fingerprint sensor 205b. The fingerprint sensor 205b is configured to capture a fingerprint from a finger 240b. The sensor 205b is disposed underneath a cover layer 212 that provides an input surface for the fingerprint to be placed on or swiped over the sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a higher resolution than the touch sensor 205a of FIG. 2A.

Figure 3A:
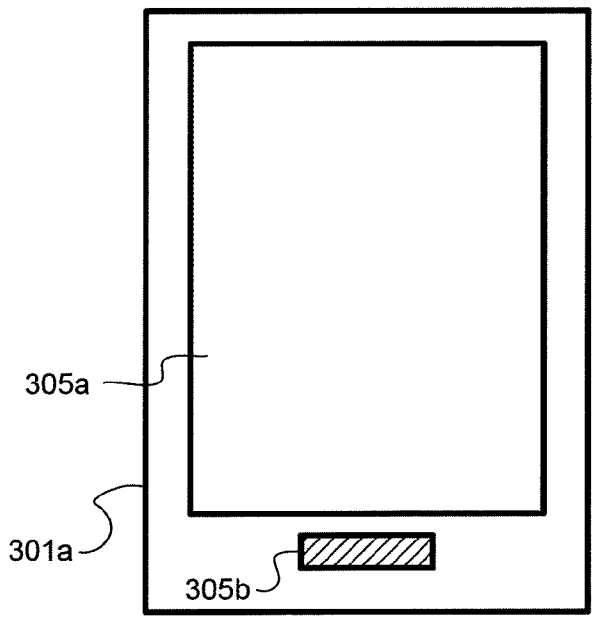
FIGS. 3A-3B are block diagrams illustrating example electronic devices having both a touch screen interface and a fingerprint sensing interface.
Figure 3B:
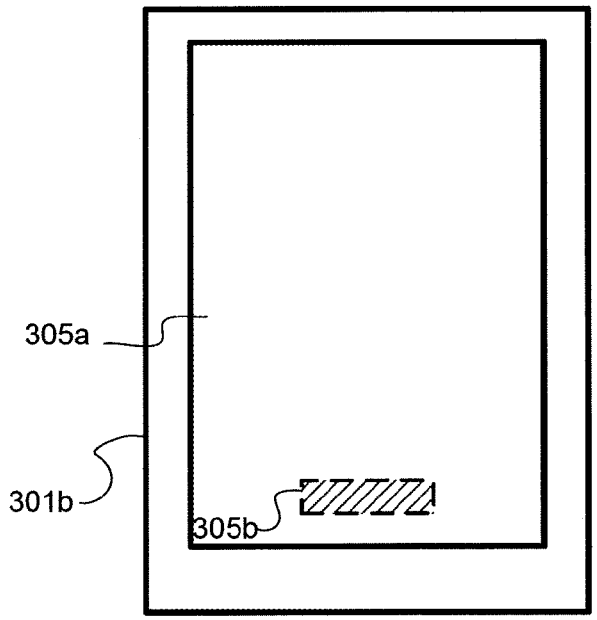

FIGS. 3A-3B are block diagrams illustrating example electronic devices 301a and 301b having both a display and a fingerprint sensing interface. In FIG. 3A, the electronic device (e.g., a mobile device, such as a smartphone or tablet) 301a has a fingerprint sensor 305b that is separate from the active display area 305a. In FIG. 3B, the electronic device 301b has a fingerprint sensor 305b that is integrated within the active display area 305a, such that the interface for the fingerprint sensor overlaps with the interface for the touch sensor. In FIG. 3A-3B, a touch sensor interface may also overlap with the active area of the display, such that the active display area includes both a fingerprint sensing and touch sensing interface. The fingerprint sensing interface may overlap with only a portion of the active area of the display, or it may overlap with an entirety of the active area of the display.

In optical fingerprint sensors that image a finger placed onto the cover glass of an electronic device, it is useful to illuminate the finger with an active light source and provide sufficient light for an optical sensor disposed below the cover glass (or built into or located under a display that is under the cover glass).

When the sensing surface is above the display, light from the display may be used to illuminate the finger (or other input object), but these illumination conditions can sometimes provide poor images of the finger. This is often caused by the direction of the light being emitted from the display, which is mostly up and out of the display, often at angles that are less than about 45 degrees from normal (in the glass). This type of illumination can give rise to poor optical contrast between the ridge and valley features on a finger that is placed onto the cover glass, especially if intense ambient light is being transmitted through the finger. This is due to the differences in the amount of light coming from the display that is reflected from the top surface of the cover glass at a ridge (where the glass is in contact with the bottom of the ridge finger surface) or valley (where there is an air gap between the glass and the bottom of the valley finger surface) compared the amount of ambient light transmitted through the finger that is then transmitted down through the cover glass toward the sensor at ridges and valleys. The different ridge/valley contrast under these two potentially competing illumination schemes can reduce (and even in some cases eliminate) the net ridge/valley contrast seen by the optical sensor.

For at least this reason, it is desirable to be able to direct enough light onto the finger or other object from the cover glass, at near glancing incidence, so that the primary source of light seen by the optical sensor is light coming from (e.g., scattered by) the finger or other object, not light coming from the display and reflecting back down to the optical sensor. This type of illumination will augment, not decrease, the ridge/valley optical contrast that is produced by potentially bright ambient light (when outdoors during daylight, for example), and when little ambient light is available, this type of illumination will provide the same ridge/valley contrast at an intensity that is sufficient to be detected by the optical sensor.

However, in some electronic devices other films are coated or glued to the bottom of the cover glass that make it difficult to inject light at a desired glancing angle into the cover glass. This can be due, for example, to the presence of decorative or opaque or reflecting layers below (or directly on the underside of) the cover glass, as well as layers directly below the cover glass that might have an index of refraction that is close to or larger than the index of refraction of the cover glass (such as a PET coating or decorative layer).

Therefore, it is desirable to inject light directly into the edge of the cover glass, where these extra films are not present; once the light has been injected into the glass, primarily at small angles relative to the glass surface, the light can propagate by total internal reflection a long distance within the cover glass toward the sensing region where the finger or other object to be detected (which may be above or outside the display area) may be located, as long as the lower surface of the cover glass is in contact only with layers that have an index of refraction less than that of the cover glass. This difference in index of refraction is related to the amount of light confined to the cover glass by total internal reflection, with a larger difference in refractive indexes confining a greater amount of light to the cover glass by total internal reflection, and thus increasing the amount of light that may be provided to the sensing region.

Figure 9A:
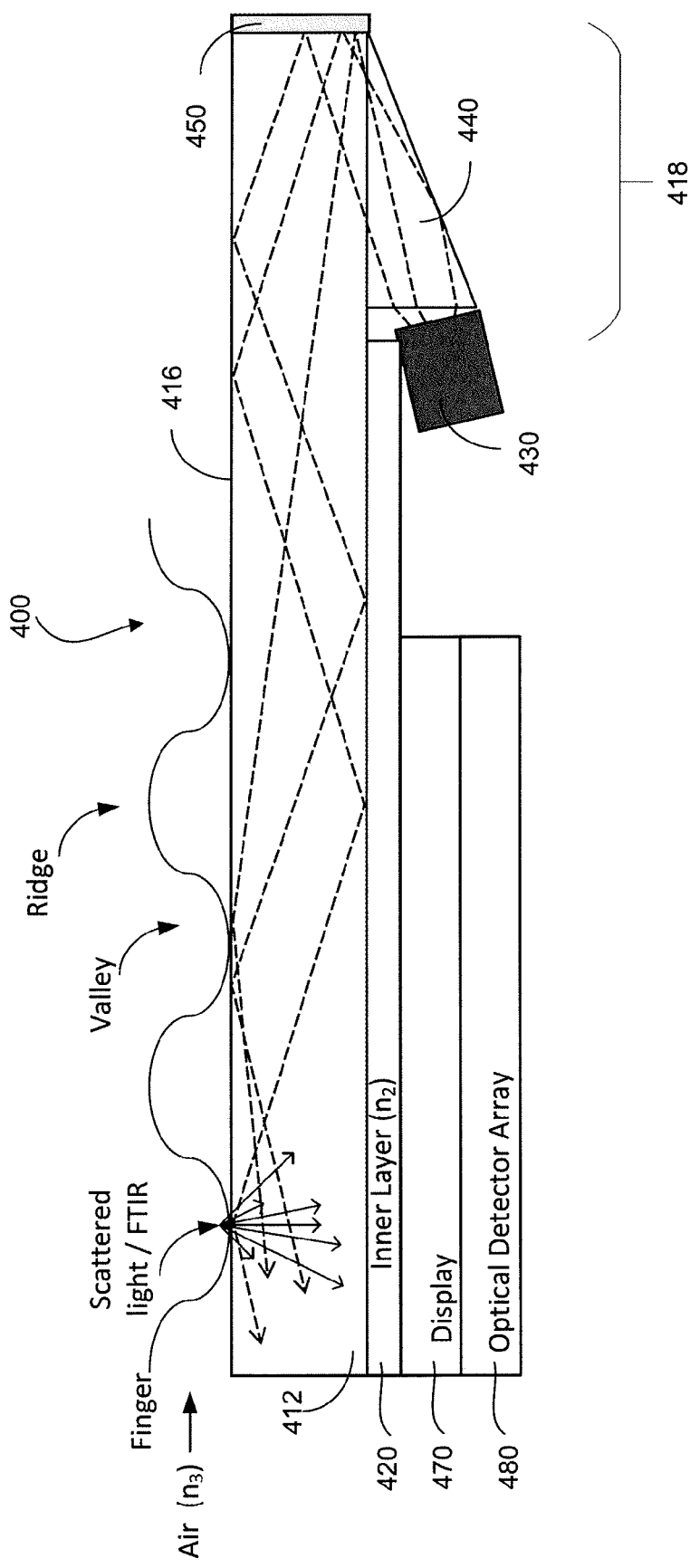
FIG. 9A is a schematic diagram of an input device including an optical sensor located below a display according to another embodiment.
Figure 9B:
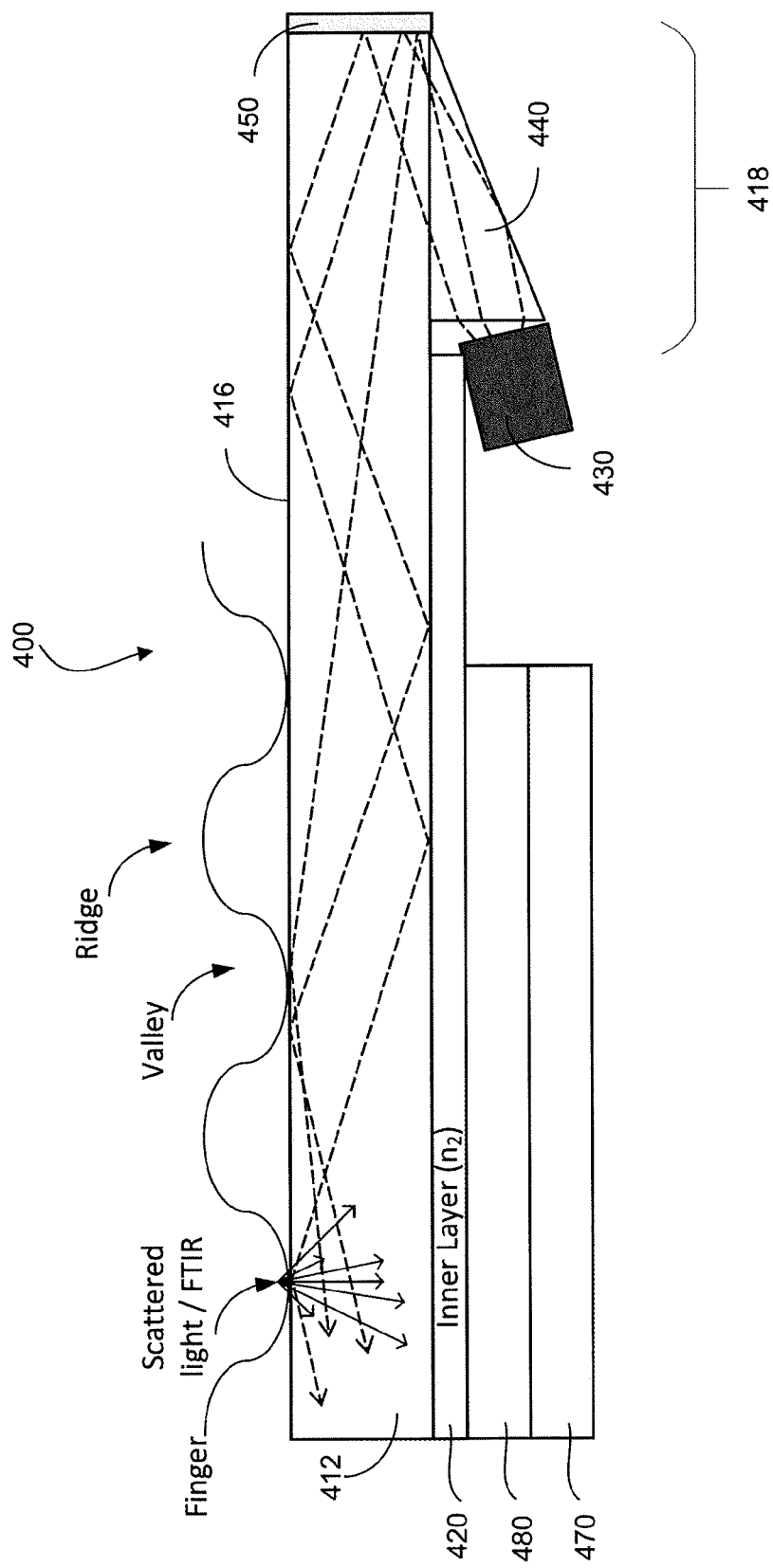
FIG. 9B is a schematic diagram of an input device including an optical sensor located above a display according to another embodiment.
Figure 9C:
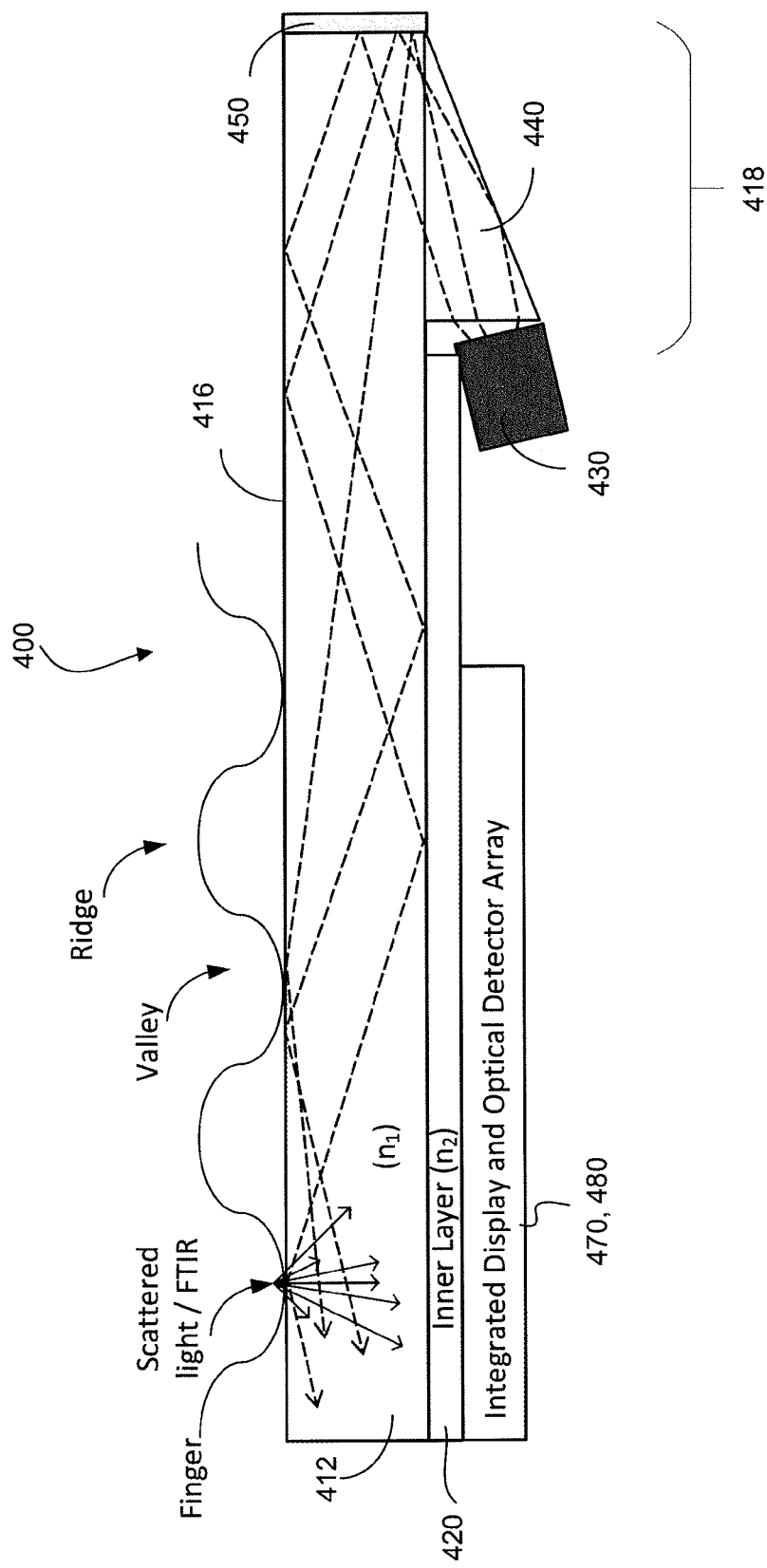
FIG. 9C is a schematic diagram of an input device including an optical sensor integrated with a display according to another embodiment.
Figure 9D:
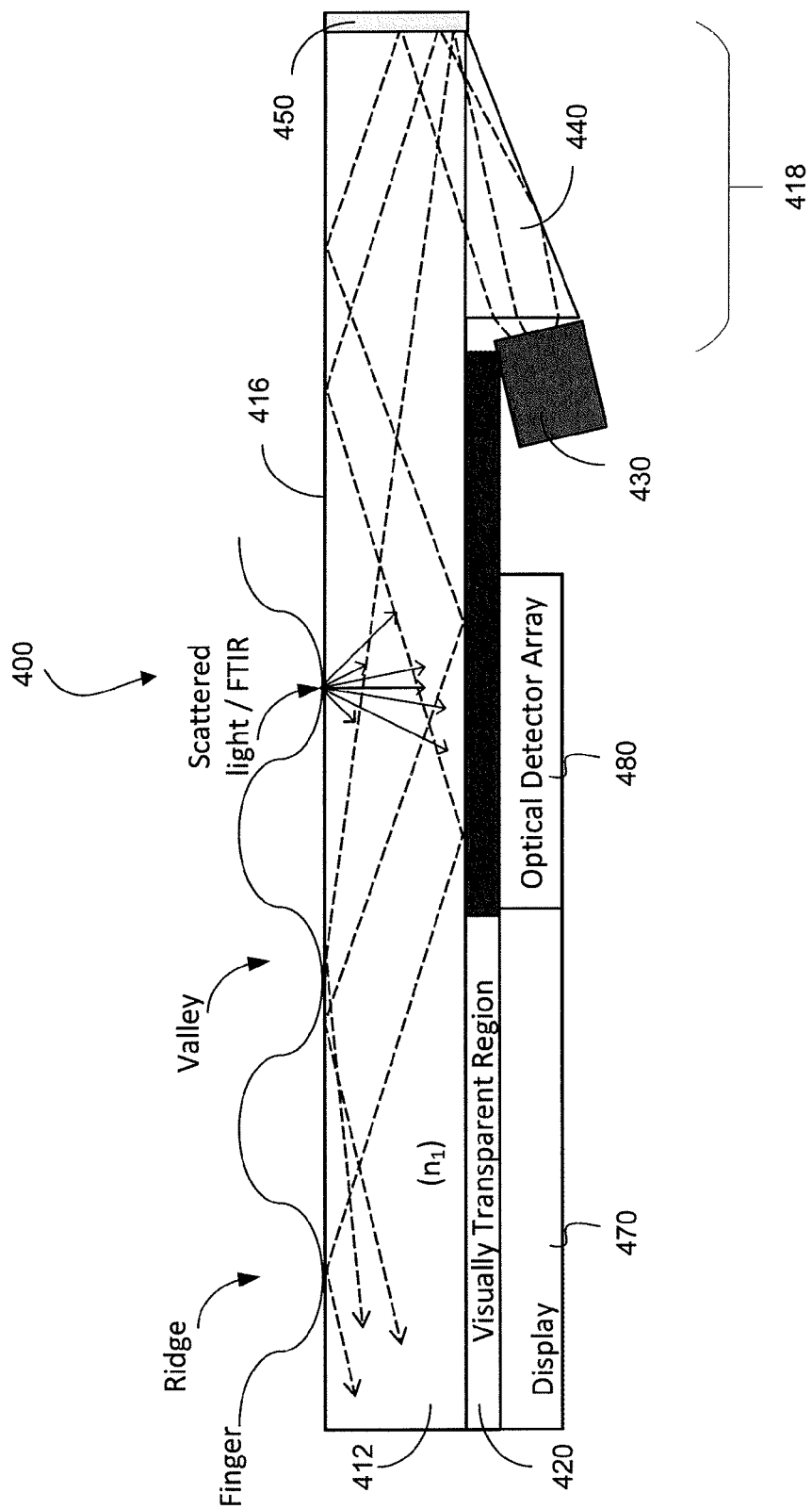
FIG. 9D is a schematic diagram of an input device including an optical sensor located outside of an active area of a display according to another embodiment.
Figure 10:
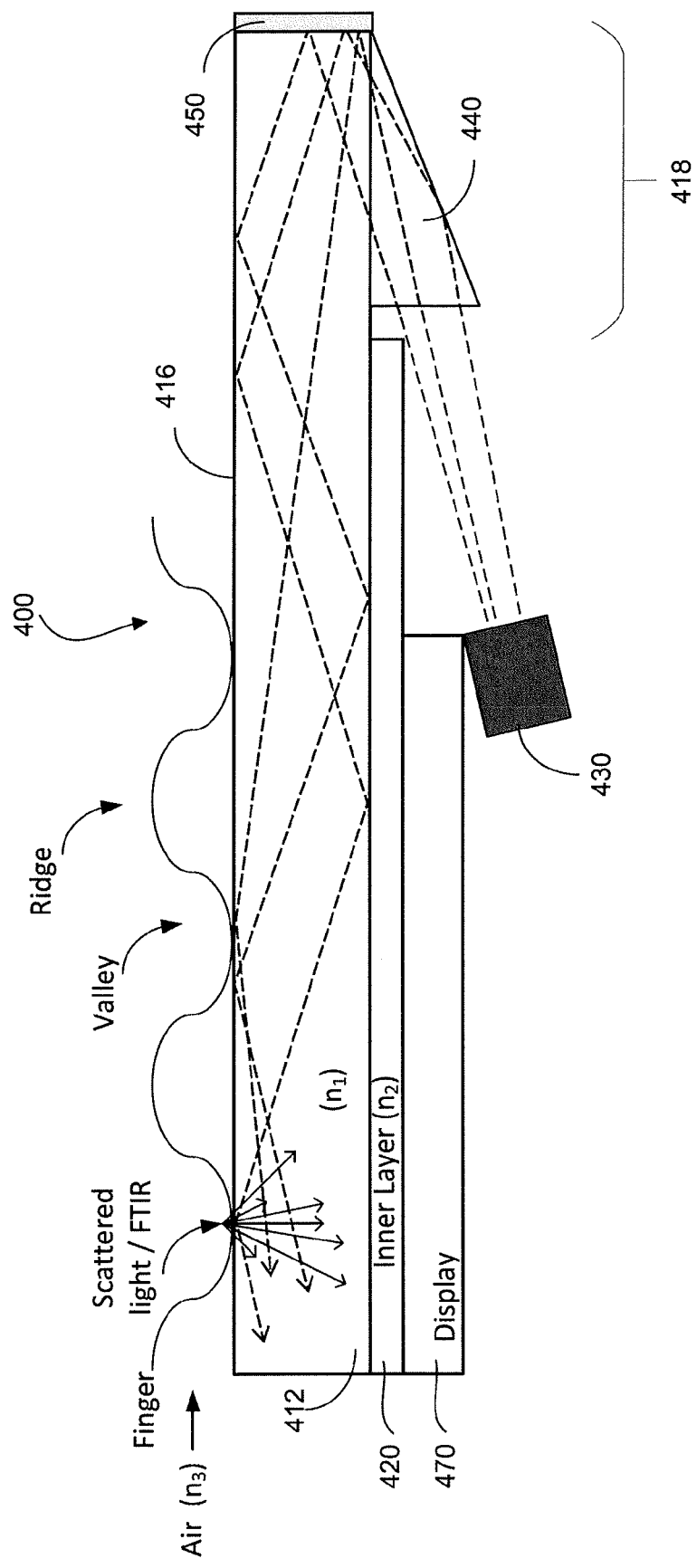
FIG. 10 is a schematic diagram of an input device including a light source located below a display according to another embodiment.
Figure 11:
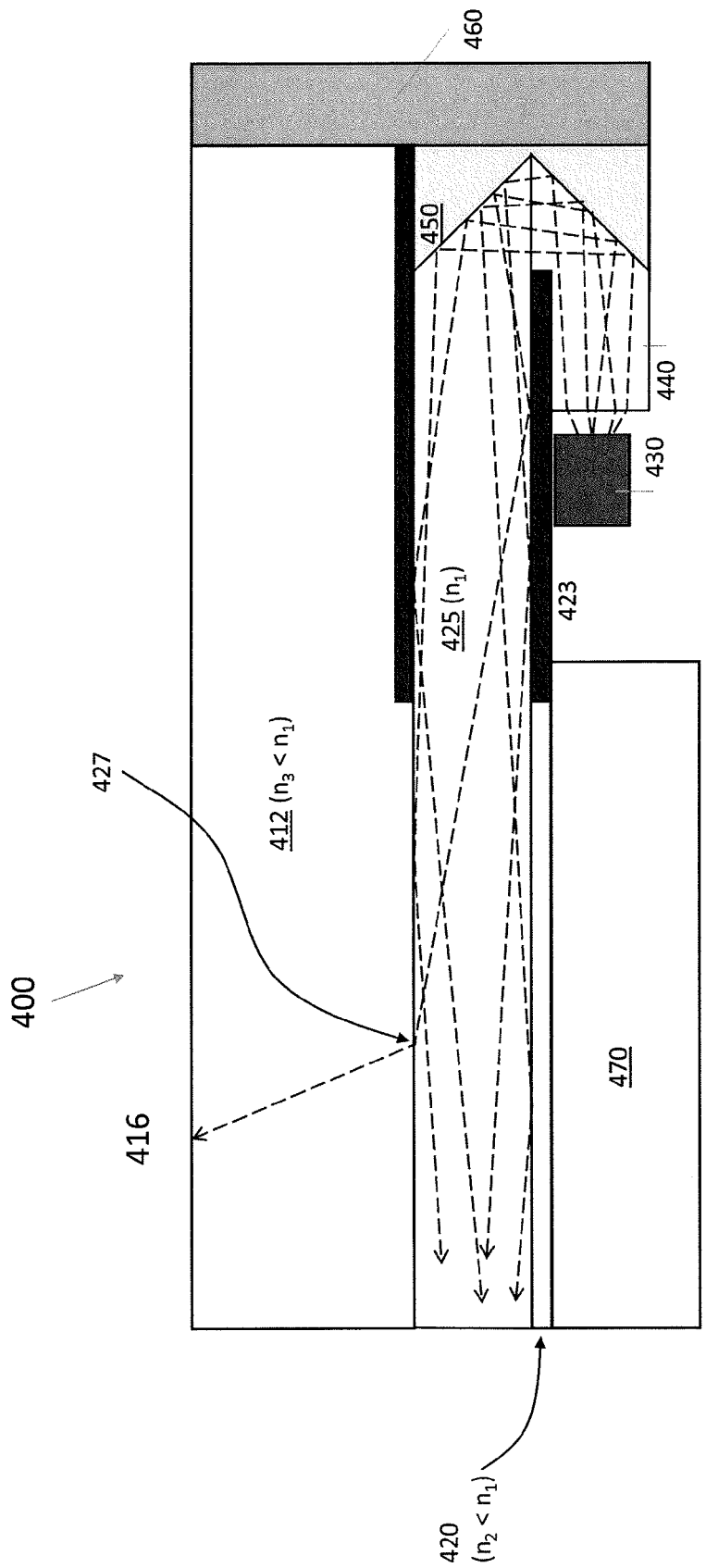
FIG. 11 shows another embodiment of an input device stack-up including a transparent waveguide layer positioned between the cover layer and material layer.
Figure 12:
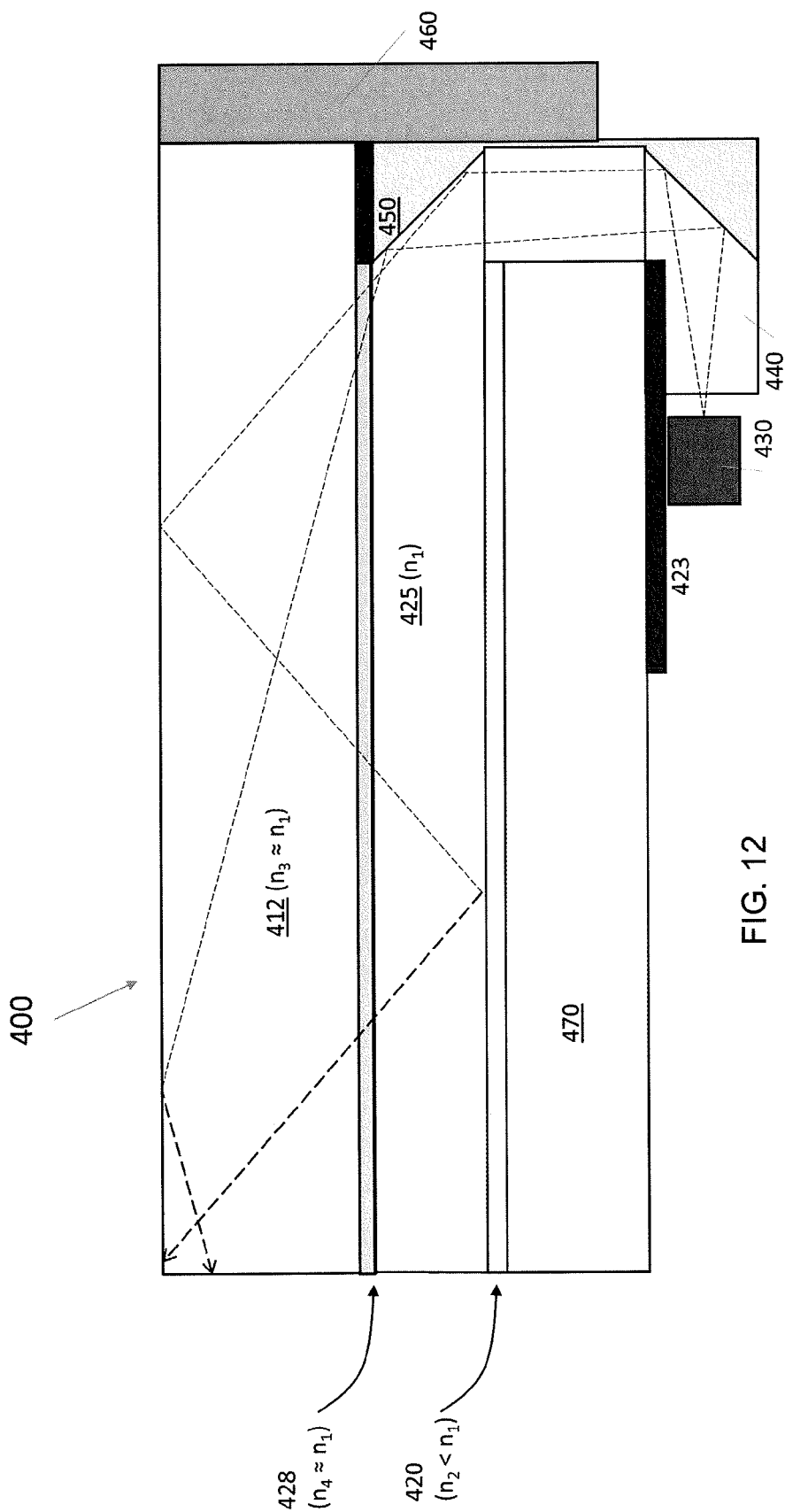
FIG. 12 shows another embodiment of an input device stack-up including a transparent waveguide layer positioned between the cover layer and material layer.

FIGS. 4-12 depict embodiments of input devices that have reflector arrangements, including reflective structures or surfaces, at the edge or end of the cover glass to allow light from a light source (such as an LED) placed below the cover glass to be reflected off the edge of the cover glass, or from a reflective surface near the edge of the cover glass, and into the cover glass (or into a waveguide layer as shown in FIG. 11 and FIG. 12) at small angles relative to the top and bottom surfaces of the cover glass along the propagation direction of the light.

Figure 4A:
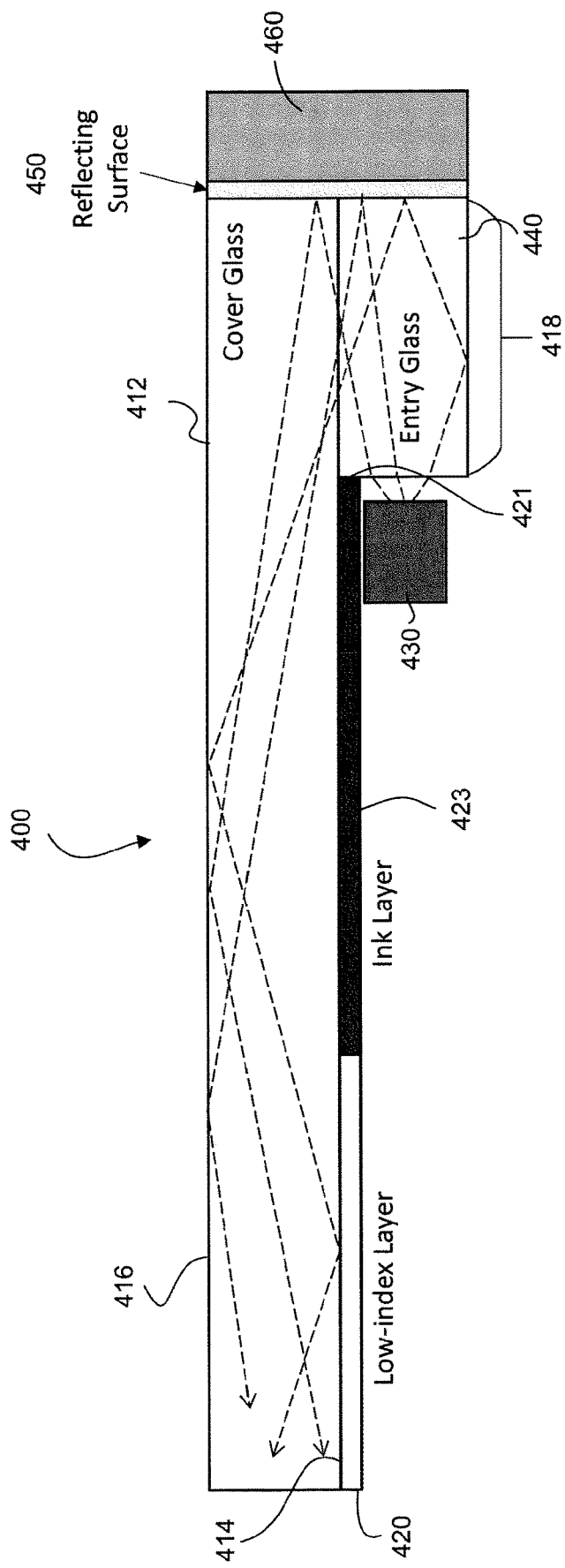
FIG. 4A is a schematic diagram of an input device including a reflector arrangement for light injection at the edge of a cover glass according to an embodiment.

FIG. 4A shows an embodiment of an input device stack-up 400 including a transparent cover layer (also referred to as "cover glass" or "cover layer") 412 and a material layer 420 disposed below, and directly contacting, the bottom surface 414 of cover glass 412. In the embodiment of FIG. 4A, material layer (also referred to as "low-index layer") 420 is made of a material having an index of refraction ($n_2$) that is less an index of refraction ($n_1$) of the cover glass 412 (i.e., $n_1 > n_2$). In certain embodiments, a portion of the material layer 420 may include an inked portion 423 proximal to the end 421 of the material layer 420. Inked portion 423 may include a coating of ink or a colored film located on the top or bottom surface of material layer 420. Inked portion 423 may be referred to herein as "ink layer" or "inked layer." As shown, cover glass 412 extends past an end 421 of material layer 420 to define a region 418 of the cover glass 420 under which material layer 420 is not present. A light source 430 is positioned or disposed below the bottom surface 414 of cover glass 412, and in the embodiment of FIG. 4A, also below material layer 420. In various embodiments, a reflector arrangement is provided to direct light from the light source 430 (e.g., LED or other light source emitting in the visible or infrared or other wavelength ranges as desired) into the cover glass 412 at an appropriate angle, or range of angles, so that at least a portion of the light injected into the cover glass propagates within the cover glass 412 due to total internal reflection. According to the embodiment shown in FIG. 4A, the reflector arrangement includes a light injection component 440 and a reflecting surface 450. Light injection component 440 may be referred to herein as "entry glass," but it should be understood that light injection component 440 may include optically transparent materials other than glass.

For example, light injection component 440 may include an extension of cover glass 412 or may include a separate piece of material (such as glass or other transparent material having an index of refraction the same as or similar to that of the cover glass 412) affixed to the bottom surface 414 of the cover glass 412 in the region 418, and reflecting surface 450 may include the end or edge of the cover glass being coated with a reflective material. Light injection component 440 is configured to transmit light from the light source 430 toward the end reflector 450 and into the cover glass 412. Although the edge of the cover glass is depicted as straight in FIG. 4A, this edge may have some other shape, such as a convex shape or a curved shape or a faceted shape. A housing structure 460 (e.g., frame) is provided to hold the various elements of input device 400 in a fixed relationship.

For embodiments where the light injection component includes a separate structure affixed to the cover layer, the index of refraction should be either the same as the cover layer (e.g., same material as cover layer) or substantially the same as the cover layer (e.g., the material has an index of refraction within a tolerance range of about 1% or 2% of the index of refraction ($n_1$) of the cover layer material).

Reflecting surface 450 could be constructed in many ways. For example, a reflective coating may be formed on an end of the transparent cover layer 412, a reflective coating may be formed on the structure 460 (e.g., frame) that holds the transparent cover layer, or a separate reflective element such as a mirror element may be positioned between the end of the cover layer and the structure 460. Specific examples include metalizing or painting the edge or end of the cover layer (which may have a smooth or rough surface) and/or an edge of the light injection component when present, or by placing a reflector element between the end of the cover layer and the frame of the mobile phone or other electronic device, or by coating the inside of the frame with a reflective material. Reflective surface 450 may also include a diffraction grating formed at or on an end of the cover glass 412 or the structure 460.

Figure 5:
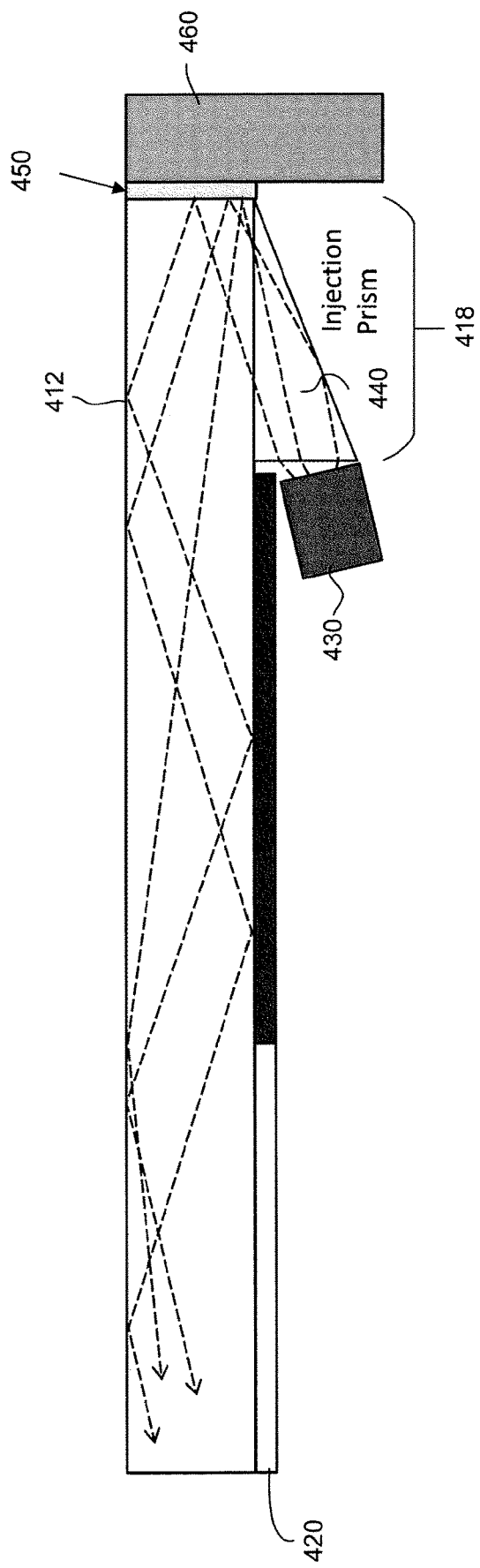
FIG. 5 is a schematic diagram of an input device including a reflector arrangement having a prism structure according to another embodiment.

Although FIG. 4A depicts a slab or brick-shaped light injecting component 440, other prismatic geometries (or materials other than glass, such as adhesives) may be used. For example, as shown in FIG. 5, another geometry that could be used in place of the injection component is a prism structure which is configured to direct light into the cover glass as shown, including by reflecting a portion of the emitted light off of a bottom, angled surface of the prism structure and toward the reflective surface 450 at the end of cover glass 412.

Figure 4B:
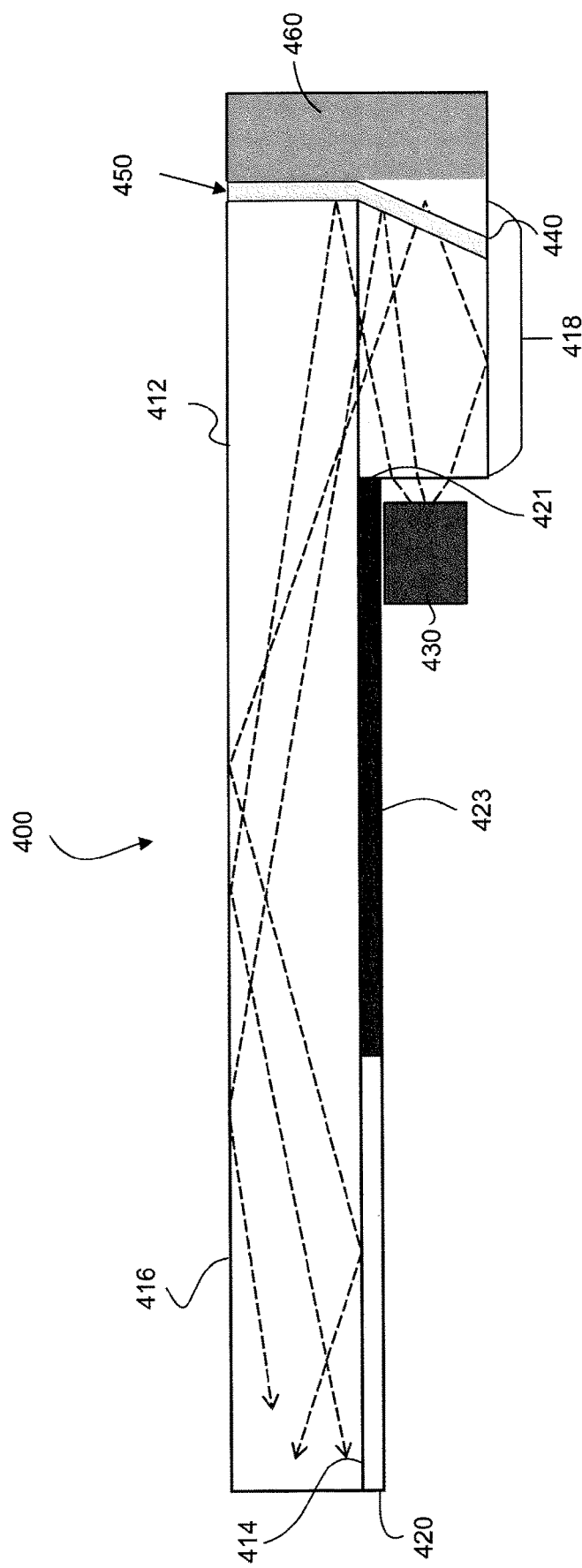
FIG. 4B is a schematic diagram of an input device including a reflector arrangement according to another embodiment.

FIG. 4B shows an embodiment similar to the embodiment shown in FIG. 4A, but with an angled reflective surface 450 formed at the end of the light injection component 440. In this embodiment, light emitted by source 430 is reflected by angled reflective surface 450 as shown. In one embodiment, reflective surface 450 may be formed only on, or proximal to, the end of the light injection component, i.e., no reflective surface on or proximal to the end of the cover glass.

Figure 6:
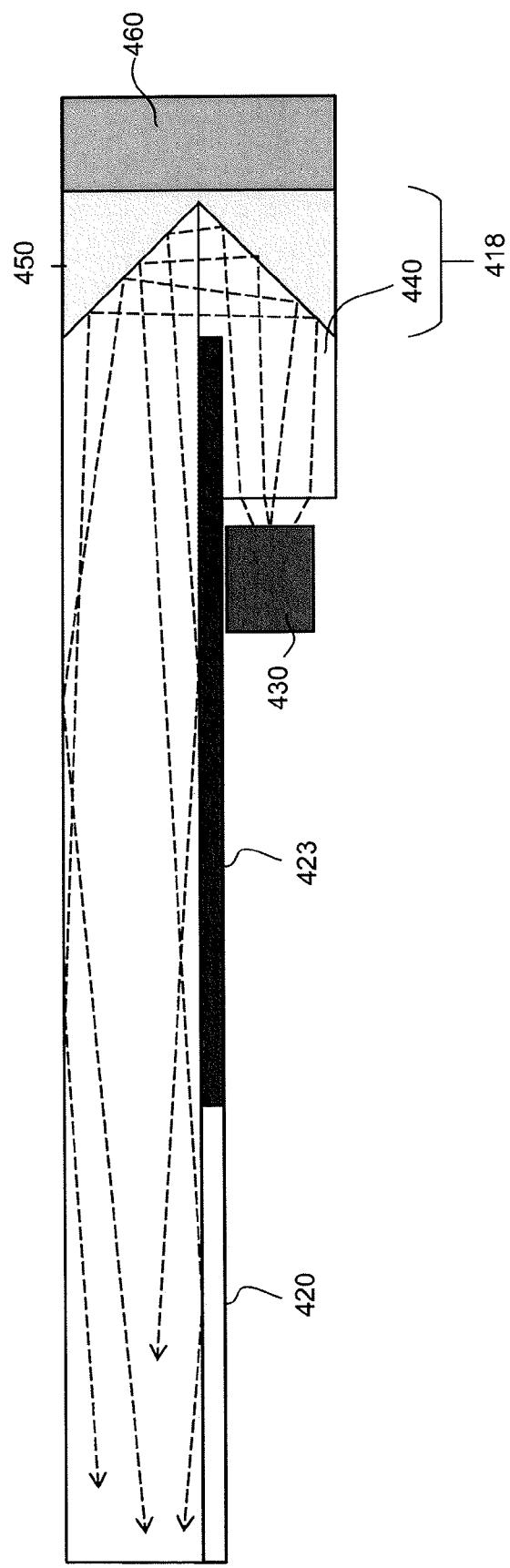
FIG. 6 is a schematic diagram of an input device including a reflector arrangement having a faceted prism structure according to another embodiment.

FIG. 6. depicts another embodiment of a reflector arrangement including a prism-shaped reflector structure 450, which provides the advantage of a smaller clear region 418 (the region where the bottom surface of the cover glass is not coated with an ink or decorative film and is not in contact with low index layer 420) at the edge of the cover glass, which would therefore be less visible from above. In particular, the top surface of the reflector 450 shown in FIG. 6 could be part of the external frame 460, or be inked (e.g., colored or coated) to appear similar to the external frame or the inked layer 423, further reducing the visibility of the reflector 450.

Figure 7:
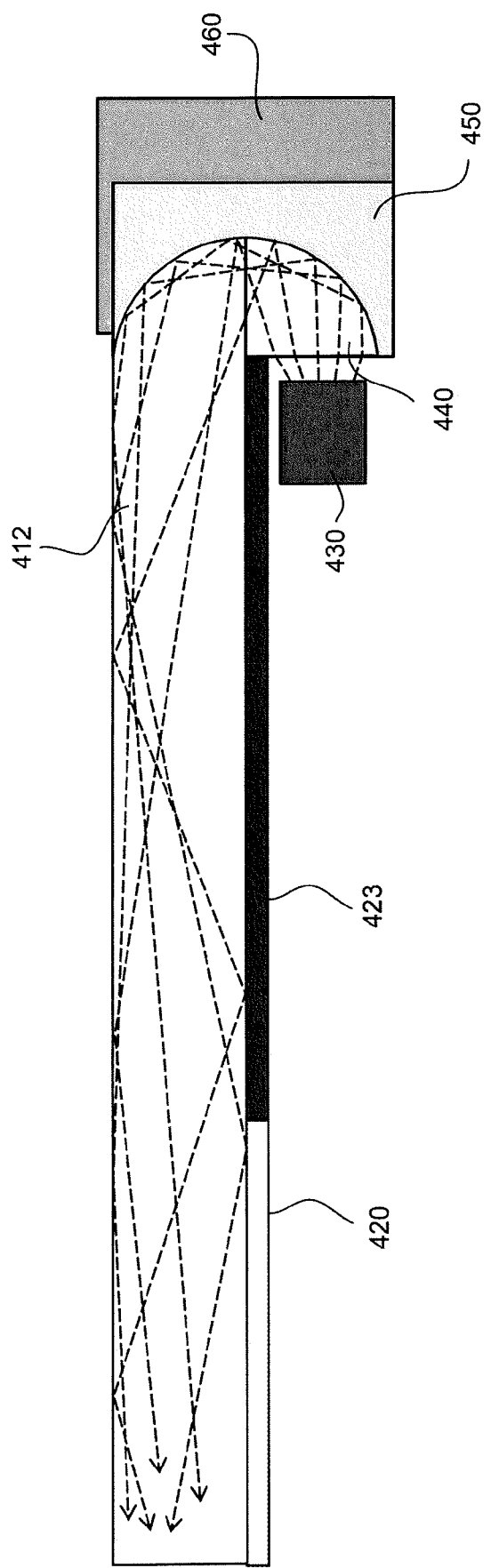
FIG. 7 is a schematic diagram of an input device including a reflector arrangement having a curved structure according to another embodiment.

FIG. 6 shows a particular right-angle reflecting prism structure, but other shapes with more or different facets could be used, including a curved edge with no facets, similar to a cylindrical shape along the edge of the cover glass. FIG. 7 depicts one example in which an edge of cover glass 412, the light injection component 440, and the reflector 450 have curved surfaces. Any number of facets may also be used to approximate the curved surface. Also, while these examples use an entry glass or other light injection component below the bottom surface of the cover glass 412, in one embodiment, the light injection component may be a part of, or integrally formed with, the cover glass. For example, in FIG. 7 the edge portion of the cover glass may include a lip protruding downward towards an inner region of the device or protruding below the low index layer 420, and the light source 430 may direct light into this protruding region.

Figure 8:
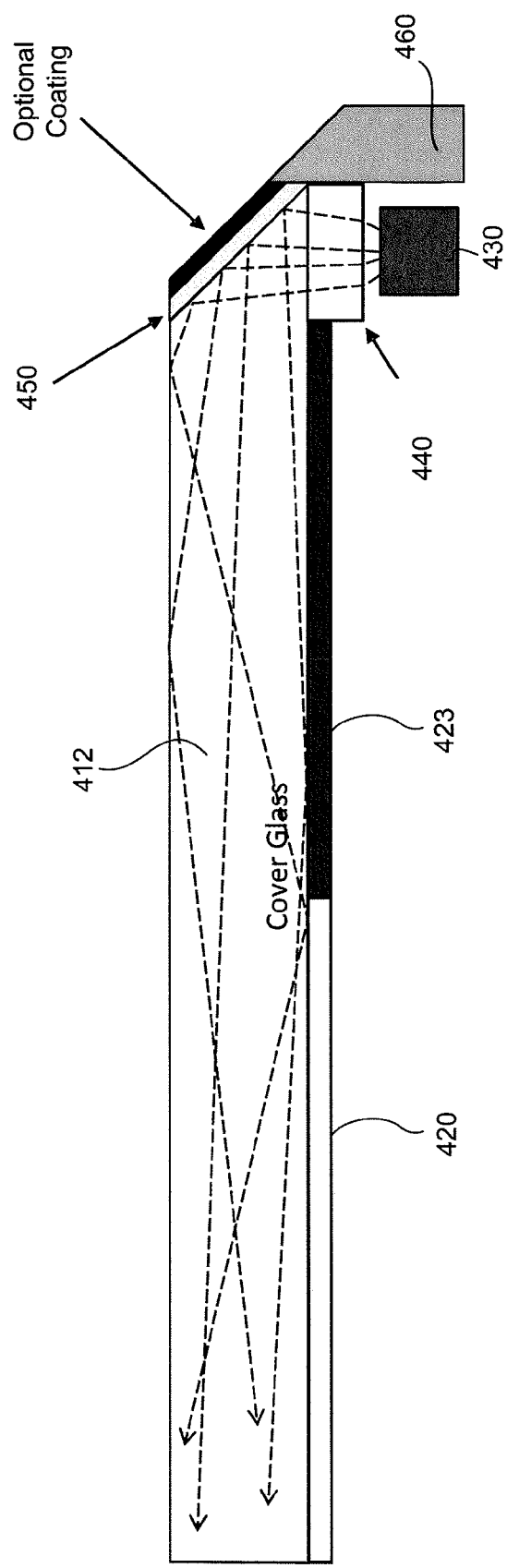
FIG. 8 is a schematic diagram of an input device including a reflector arrangement according to another embodiment.

FIG. 8 depicts another embodiment in which the light source 430 is positioned below the cover glass 412 in region 418 and directs light up towards a reflecting surface 450 in the edge region of cover layer 412. The reflecting surface may include a single facet as shown in FIG. 8, or may include a curved or multi-faceted surface. A discrete reflector may be included or a reflective surface may be coated on the edge of the cover glass, or the surface of the cover glass itself may provide the reflector functionality if the light is directed at the appropriate angle and the edge is curved or faceted with the appropriate geometry (e.g., so that TIR occurs at the region(s) of incidence of the light onto the edge surface). In this embodiment, the light injection component 440 is optional (but is also depicted in FIG. 8). With the right choice of index of refraction or shape for light injection component 440 (e.g., may include a lens element or a glue dome that acts as a lens), light injection component 440 will help focus the light to keep more of the light in the cover glass. A coating similar in color to the frame or ink layer 423, or a portion of the frame itself, may extend over the edge of the cover glass to improve the aesthetic qualities of the input device. In this embodiment, light source 430 is positioned below the external facet, which may be inked (e.g., include an ink layer).

FIGS. 9A-9D depict additional embodiments of input device 400 having different device layer configurations. In FIGS. 9A-9D, input device 400 includes a transparent cover layer (also referred to as "cover glass" or "cover layer") 412 made of a material having a refractive index $n_1$. The top surface 416 of the transparent cover layer provides an input surface for a finger. Material layer (also referred to as "inner layer") 420 comprising a film or layer made of a material having a refractive index $n_2$ is provided below a bottom surface of the cover layer 412. The inner layer 420 may interface with the bottom surface of the cover layer, and the refractive index $n_1$ of the cover layer 412 may be greater than both the refractive index $n_2$ of the inner layer 420 and the refractive index $n_3$ of air or another material that interfaces with the top surface 416 of the cover layer 412. This allows light injected by the light source 430 to be confined within the cover layer via total internal reflection. As shown, light source 430 is located below the cover glass 412 and directs light towards a reflective surface 450 proximal to the edge of the cover glass 412, which reflects light into the cover glass 412 at desired angle or range of angles. An area 418 in the peripheral portion or proximal to the edge of the cover glass 412 is free of the inner layer 420 to allow for light emitted by the light source 430 to be injected into the cover glass 412 around the inner layer 420.

A display stack (also referred to as "display") 470 and an optical sensor (also referred to as "optical detector array") 480 may be positioned below the cover layer 412 and below the inner layer 420. The optical sensor may include an array of detector elements, such as a plurality of photosensors, sensitive to the wavelengths of light from the light source and may be used to capture an image of a fingerprint or other object provided above the cover glass 412. In FIG. 9A, the optical sensor 480 is positioned below the display stack 470 and captures the fingerprint through the display stack and through the inner layer. In FIG. 9B, the optical sensor 480 is positioned above the display stack 470 and captures the fingerprint image through the inner layer. In FIG. 9C, the optical sensor 480 is integrated into the display stack 470, for example, using thin film detectors formed in the same layer or layers used to address individual display pixels or sub-pixels. In any of FIGS. 9A-9C, the optical sensor 480 may span an entire active area of the display 470 or only a portion of the active area of the display 470. In FIG. 9D, the optical sensor 480 is positioned outside of the active area of the display 470, e.g., underneath an inked region of the inner layer 420, while the active area of the display 470 is positioned under a visually transparent region of the inner layer 420. In this example, the inked region may be transparent to the wavelength(s) of light from the light source 430, but opaque or substantially opaque in a visible spectrum or other spectrum.

FIG. 10 shows another embodiment of an input device 400 with light source 430 positioned below the display 470. Depending on the distance between light source 430 and the reflector arrangement and/or the placement of other device components between light source 430 and the reflector arrangement, additional optical elements (not shown) may be included to direct the emitted light to the reflector arrangement. For example, a set of one or more mirror elements arranged in a periscope-type configuration may direct the emitted light to a light injection component. It should be appreciated that any of the reflector arrangement embodiments as described herein may be used in conjunction with the light source location (under the display) as shown in FIG. 10.

In certain embodiments, the material layer 420 may include any desirable material. Examples of useful materials might include a silicone adhesive material, which can have an index of refraction of about 1.4. Such materials should have an index of refraction ($n_2$) that is lower than the index of refraction ($n_1$) of the cover layer material. In other embodiments, the material layer 420 is replaced with an inner layer made of an air gap. For a cover layer including a glass, the index of refraction ($n_1$) will typically be about 1.5. In certain embodiments, a thickness of the cover layer is typically in the range of about 400 μm to about 1000 μm, but may be larger or smaller, and a thickness of material layer 420 is typically in the range of about 100 μm to about 300 μm, but may be larger or smaller. Additionally, in certain embodiments, a dimension of the region 418 is commensurate in size with the thickness of the cover layer 412. For example, the linear distance defining region 418 (e.g., from the end 421 of the material layer 420 to the reflecting surface at the end of the cover layer 412) is typically on the order of 400 μm to about 1000 μm or larger, but may be smaller, such as for the embodiments shown in FIGS. 6-8.

FIG. 11 shows another embodiment of an input device stack-up 400 including a transparent waveguide layer 425 positioned between the cover layer 412 and material layer 420. Waveguide layer 425 includes a material having an index of refraction ($n_1$) that is larger than the index of refraction ($n_3$) of glass layer 412 (or larger than the index of refraction of one or more layers between the transparent waveguide layer 425 and the cover layer 412), and also larger than the index of refraction ($n_2$) of material layer 420. Light may be injected into the waveguide layer 425 similar to the way light is injected into the cover layer 412 in the embodiments shown in FIGS. 4-10, so as to propagate by TIR within waveguide layer 425. In the specific embodiment shown in FIG. 11, light is injected or redirected into waveguide layer 425 using a prism-shaped reflector structure 450, although any light source-reflector structure configuration as discussed herein may be used. For example, the light source may also be placed under the display as depicted in FIG. 10.

In the embodiment shown, a light extraction feature 427 extracts, or redirects, at least some of the light propagating in the waveguide layer 425 into the cover layer 412 toward the input surface or sensing region on surface 416, e.g., toward a finger proximal the sensing region. The light extraction feature 427 may include one or more features, such as diffraction gratings or other features, on a top surface of the waveguide, configured to redirect light toward one or more specific (sensing) locations on the top surface 416. By way of example, diffraction grating(s) can be formed by etching periodic structures in a top surface of the waveguide layer 425.

FIG. 12 shows another embodiment of an input device stack-up 400 including a transparent waveguide layer 425 positioned between the cover layer 412 and material layer 420. In this embodiment, with no light extraction feature present, the index of refraction of the cover layer 412 is the same as or similar to the index of refraction of the waveguide layer 425. In this embodiment, the reflector structure is configured to redirect light into the cover layer 412, but only through the "side" of the waveguide layer 425 as shown. The light propagates through both the waveguide layer 425 and the cover layer 4122 in TIR mode. Effectively, both the cover layer 412 and the waveguide layer 425 act together, in concert, as a light guide. In certain embodiments, an adhesive layer is also provided between waveguide layer 425 and cover layer 412. The adhesive layer includes a material having an index of refraction ($n_4$) that is the same as or substantially the same as the index of refraction of the cover layer and the waveguide layer. The embodiments illustrated in FIGS. 4-12 advantageously permit light to be injected at the edge of the cover glass at angles that allow the light to propagate by total internal reflection through the cover glass toward the finger or other object that is placed over the optical sensing area. Some embodiments (such as are shown in FIGS. 6-7) also provide cosmetic advantages, such as by hiding the location at which the light is injected into the cover glass. The various embodiments provide efficient ways of insuring consistent and sufficient illumination of the optical sensing area and hence the finger, even in an unobtrusive manner that does not detract from the mobile device's aesthetic appearance.

It is noted that reference herein to a "layer" does not necessarily require a single layer structure, but can instead include a multilayer structure. For example, a transparent cover layer may include a single layer of a cover sheet (e.g., a single cover glass sheet) or a multilayer structure forming a cover sheet (e.g., multiple laminated sheets or a cover glass sheet including one or more adhesive layers).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate or illustrate the invention and does not pose a limitation on the scope of the invention unless otherwise claimed. No language in the specification should be construed as indicating any non-claimed element as essential to the practice of the invention.

Various embodiments of this invention are described herein. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device, comprising:
   a transparent layer having a top surface and a bottom surface;
   an inner layer positioned below and directly contacting the bottom surface of the transparent layer, wherein the inner layer has a second index of refraction ($n_2$) that is lower than a first index of refraction ($n_1$) of the transparent layer, wherein a first region of the transparent layer extends past an end of the inner layer, wherein the inner layer includes an inked portion proximal to the end of the inner layer;
   a light source positioned directly below the inked portion of the inner layer; and
   a reflector arrangement configured to reflect light emitted by the light source into the transparent layer in the first region of the transparent layer, wherein at least a portion of the light reflected into the transparent layer propagates within the transparent layer by total internal reflection.

2. The device of claim 1, wherein the reflector arrangement includes a light injection component positioned below the transparent layer proximal to the first region of the transparent layer, wherein the light injection component has an index of refraction substantially the same as the first index of refraction ($n_1$) of the transparent layer.

3. The device of claim 1, wherein the reflector arrangement includes a reflecting surface formed on or proximal to an end of the transparent layer.

4. The device of claim 3, wherein the reflecting surface includes one of a reflective coating formed on the end of the transparent layer, a reflective coating formed on a structure that holds the transparent layer proximal to the end of the transparent layer, and a reflective element positioned between the end of the transparent layer and the structure.

5. The device of claim 1, wherein the transparent layer is a transparent cover layer, the device further comprising:
   an optical sensor positioned below the inner layer and configured to detect a fingerprint proximal to the top surface of the transparent cover layer and illuminated by the at least a portion of the light reflected into the transparent cover layer.

6. The device of claim 1, wherein the transparent layer is a transparent waveguide layer, the device further comprising a transparent cover layer having a top surface and a bottom surface, wherein the transparent waveguide layer is positioned below the bottom surface of the transparent cover layer.

7. The device of claim 6, further comprising a light extraction feature positioned on a top surface of the transparent waveguide layer and configured to redirect a portion of the light propagating within the transparent waveguide layer toward the top surface of the transparent cover layer.

8. The device of claim 7, wherein at least one of the transparent cover layer and an adhesive layer between the transparent cover layer and the transparent waveguide layer has a third index of refraction ($n_3$) that is lower than the first index of refraction ($n_1$) of the transparent waveguide layer.

9. The device of claim 7, further comprising an optical sensor positioned below the inner layer and configured to detect a fingerprint proximal to the top surface of the transparent cover layer and illuminated by the portion of light redirected by the light extraction feature.

10. The device of claim 6, wherein the transparent cover layer has a third index of refraction ($n_3$) that is substantially the same as the first index of refraction ($n_1$) of the transparent waveguide layer, wherein the first region of the transparent waveguide layer extends past an end of the inner layer, and wherein at least a portion of the light reflected into the transparent waveguide layer propagates within both the transparent waveguide layer and the transparent cover layer by total internal reflection.

11. The device of claim 10, further comprising an adhesive layer between the bottom surface of the transparent cover layer and a top surface of the transparent waveguide layer, wherein the adhesive layer has a fourth index of refraction ($n_4$) that is substantially the same as the first index of refraction ($n_1$) of the transparent waveguide layer.

12. An input device, comprising:
a transparent cover layer having a top surface and a bottom surface;
a material layer positioned below and directly contacting the bottom surface of the transparent cover layer, wherein the material layer has a second index of refraction ($n_2$) that is lower than a first index of refraction ($n_1$) of the transparent cover layer, wherein a first region of the transparent cover layer extends past an end of the material layer, wherein the material layer includes an inked portion proximal to the end of the material layer;
a display layer disposed below the material layer;
a light source positioned directly below the display layer; and
a reflector arrangement configured to reflect light emitted by the light source into the transparent cover layer in the first region of the transparent cover layer, wherein at least a portion of the light reflected into the transparent cover layer propagates within the transparent cover layer by total internal reflection.

13. The device of claim 12, wherein the reflector arrangement includes a light injection component positioned below the transparent cover layer proximal to the first region of the transparent cover layer, wherein the light injection component has an index of refraction substantially the same as the first index of refraction ($n_1$) of the transparent cover layer.

14. The device of claim 12, wherein the reflector arrangement includes a reflecting surface formed on or proximal to an end of the transparent cover layer.

15. The device of claim 14, wherein the reflecting surface includes one of a reflective coating formed on the end of the transparent cover layer, a reflective coating formed on a structure that holds the transparent cover layer proximal to the end of the transparent cover layer and a reflective element positioned between the end of the cover layer and the structure.

16. The device of claim 12, further including an optical sensor positioned below the material layer and configured to detect a fingerprint proximal to the top surface of the transparent cover layer and illuminated by the at least a portion of the light reflected into the transparent cover layer.

17. The device of claim 16, wherein the optical sensor is positioned between the display layer and the material layer.

18. The device of claim 16, wherein the optical sensor is integrated into the display layer.

19. An input device, comprising:
a transparent cover layer having a top surface and a bottom surface;
a waveguide layer positioned below the bottom surface of the transparent cover layer;
a material layer positioned below and directly contacting a bottom surface of the waveguide layer, wherein the material layer has a second index of refraction ($n_2$) that is lower than a first index of refraction ($n_1$) of the waveguide layer, wherein a first region of the waveguide layer extends past an end of the material layer, wherein the material layer includes an inked portion proximal to the end of the material layer;
a light source positioned directly below the inked portion of the material layer;
a reflector arrangement configured to reflect light emitted by the light source into the waveguide layer in the first region of the waveguide layer, wherein at least a first portion of the light reflected into the waveguide layer propagates within the waveguide layer by total internal reflection; and
a light extraction feature positioned on a top surface of the waveguide layer between the waveguide layer and the transparent cover layer and configured to redirect a portion of the light propagating within the waveguide toward the top surface of the transparent cover layer.

20. The input device of claim 19, wherein the light extraction feature includes a diffraction grating.

* * * * *